US012631269B2

(12) United States Patent　(10) Patent No.: US 12,631,269 B2
Jurasz et al.　(45) Date of Patent: May 19, 2026

(54) SYSTEM FOR TRANSPORTING AND STORING, IN PARTICULAR HYDROGEN AND ITS MIXTURES

(71) Applicants: Jerzy Jurasz, Rzeszow (PL); Olga Jurasz, Wisniowa (PL)

(72) Inventors: Jerzy Jurasz, Rzeszow (PL); Olga Jurasz, Wisniowa (PL)

( * ) Notice: Subject to any disclaimer, the term of this patent is extended or adjusted under 35 U.S.C. 154(b) by 6 days.

(21) Appl. No.: 18/695,884

(22) PCT Filed: Oct. 27, 2022

(86) PCT No.: PCT/PL2022/000061

§ 371 (c)(1),
(2) Date: Mar. 27, 2024

(87) PCT Pub. No.: WO2023/075618

PCT Pub. Date: May 4, 2023

(65) Prior Publication Data

US 2024/0401753 A1　Dec. 5, 2024

(30) Foreign Application Priority Data

Oct. 31, 2021　(PL) ........................................ 439371

(51) Int. Cl.
*F16L 1/026*　(2006.01)
*F16L 1/028*　(2006.01)
(Continued)

(52) U.S. Cl.
CPC .............. *F16L 1/026* (2013.01); *F16L 1/028* (2013.01); *F16L 1/032* (2013.01); *F16L 1/036* (2013.01);
(Continued)

(58) Field of Classification Search
CPC . F16L 1/026; F16L 59/15; F16L 1/028; F16L 1/032; F16L 1/036; F16L 1/038; F17D 1/08; F17D 1/02; F17D 1/18
See application file for complete search history.

(56) References Cited

U.S. PATENT DOCUMENTS 2,958,205 A　11/1960　Boyd
3,256,705 A　6/1966　Moses
(Continued)

FOREIGN PATENT DOCUMENTS

CA　1316045 C　*　4/1993　............ F04B 49/065
CN　113390019　9/2021
(Continued)

OTHER PUBLICATIONS https://new.aab.com/process-automation/pl/energy-industries/abb-wodor/dlaczego-teraz.
http://zs9elektronik.pl/inne/karolina/podr_6_magazynowanie_i_transport_wodoru.pdf rozdział 6.3 i 6.4.

*Primary Examiner* — Atif H Chaudry
(74) *Attorney, Agent, or Firm* — Defill & Associates, Inc; Evelyn A. Defillo

(57) ABSTRACT

A system for transporting and storing hydrogen and its mixtures from their supplier to customers, partially located underground, including at least two vertically positioned tubular elements connected with each other by a tubular element forming a tubular U-profile, the upper end of the tubular element is connected via a non-return valve, to the tubular element into which the pump pumps hydrogen from the tubular element connected to the at least one supplier of hydrogen, the upper end of the tubular element is connected via a non-return valve to the tubular element connected to at least one consumer of hydrogen, a heating and cooling device adheres to the outer surfaces of the tubular elements, the tubular U-profile is placed below the ground surface, (Continued)

below the permafrost border, and the weight of the upper layer of the earth above the tubular U-profile balances the planned gas pressure in the tubular elements.

4 Claims, 5 Drawing Sheets

(51) Int. Cl.

| | | |
|---|---|---|
| *F16L 1/032* | (2006.01) | |
| *F16L 1/036* | (2006.01) | |
| *F16L 1/038* | (2006.01) | |
| *F16L 59/15* | (2006.01) | |
| *F17D 1/18* | (2006.01) | |

(52) U.S. Cl.
CPC ............... *F16L 1/038* (2013.01); *F16L 59/15* (2013.01); *F17D 1/18* (2013.01)

(56) References Cited

U.S. PATENT DOCUMENTS

| | | | |
|---|---|---|---|
| 3,474,806 | A | 10/1969 | Coldren |
| 4,589,434 | A | 5/1986 | Kelley |
| 5,294,214 | A | 3/1994 | Conner |
| 9,482,109 | B2 * | 11/2016 | de Chabris ............. F01D 15/10 |
| 2008/0264495 | A1 | 10/2008 | Ramachandran |
| 2015/0252950 | A1 | 9/2015 | Hyde |

FOREIGN PATENT DOCUMENTS

| | | | |
|---|---|---|---|
| DE | 112008000393 T5 * | 12/2009 | ........ H01M 8/04089 |
| DE | 10201003747 | 1/2012 | |
| EP | 0345126 B1 * | 4/1992 | |
| JP | S6361932 A * | 3/1968 | |
| JP | 4789666 | 10/2011 | |
| PL | 184289 | 9/2002 | |
| PL | 3123094 | 3/2015 | |
| WO | WO2012174642 | 12/2012 | |

* cited by examiner

SYSTEM FOR TRANSPORTING AND STORING, IN PARTICULAR HYDROGEN AND ITS MIXTURES

CROSS REFERENCE TO RELATED APPLICATION

This application is a national stage entry of PCT/PL2022/000061 filed Oct. 27, 2022, under the International Convention and claiming priority over Poland Patent Application No. P.439371 filed Oct. 31, 2021.

FIELD OF THE INVENTION

The subject of the invention is a system for transporting and storing hydrogen and its mixtures in their compressed or liquid state, mainly from their producers (e.g. photovoltaic cell farms) to end users, which are usually retail or wholesale gas/hydrogen distribution stations, power plants e.g. hydrogen cells that are switched on during a peak current consumption, plants that use gas-hydrogen permanently as an alternative, cheap and ecological source of energy for the generation of electricity and heat, stations to reduce the pressure of the gas-hydrogen and for further distribution, including to individual residential houses, or liquid hydrogen production stations located, for example, at airports.

BACKGROUND OF THE INVENTION

Hydrogen is a low-carbon energy source that can support the energy transition, and by substituting fossil fuels it helps the natural environment. Hydrogen can act as a flexible energy carrier, increasing the possibilities of integrating renewable energy sources (RES) in the energy system, whereby it is assumed that the installed capacity in RES will be used for the purposes of hydrogen production based on electrolysis, and green hydrogen will come mainly from photovoltaic farms, onshore and offshore wind farms and nuclear power plants as well as other clean (in particular $CO_2$ and methane free) energy sources. It will be stored similarly to gas in caverns, but injection of this hydrogen into the existing gas distribution network is also considered. Currently, the popularity of hydrogen, in particular green produced using renewable energy, already covers all sectors of the economy. This is due to growing concern about the effects of climate change and growing awareness of the potential of hydrogen to reduce emissions of carbon dioxide ($CO_2$), methane and other gases and pollutants. In addition, hydrogen as a substitute for fossil fuels and used for energy storage will contribute to the achievement of the climate goals set out in many laws and strategies, including the Paris Agreement and the European Union's 2050 climate neutrality strategy.

Thus, it turns out that only hydrogen can maintain the rapid pace of development of the renewable energy sector, which will significantly reduce greenhouse gas emissions, and the decreasing costs of green energy and the growing share of its renewable sources in the energy mix broaden the understanding of the potential of hydrogen to store solar and wind energy, because during combustion, hydrogen produces only water vapour, which condenses immediately and as perfectly (demineralized) pure water, instead of carbon dioxide, it can return to the environment.

From the publication on the website https://new.aab.com/process-automation/pl/energy-industries/abb-wodor/dlaczego-teraz, there is known a method of producing hydrogen directly from water by means of electrolysis in which the voltage applied between two electrodes splits water into two components, i.e. oxygen and hydrogen. In a fuel cell, on the other hand, the process is reversed, as the hydrogen and oxygen from the air react without combustion to form water. The reaction generates electricity and waste heat, with hydrogen being the carrier of electricity in this cycle. In addition, hydrogen can be produced directly in renewable energy production sites and can be stored and transported by pipelines to distant consumers, and depending on the user's needs, it can be burned, used as a material or converted into electricity again.

In addition, many methods of electrolysis and devices used in this process are known today, for example high-temperature electrolysis, in which steam at high temperatures is subjected to the electrolysis, and the efficiency of this method is at the level of 90%.

Also, from the publication on the website https://globeneria.pl/magazyn/sposoby-na-długoterminowe-magazynowanie-energii/, there is known a method of storing energy in compressed air, known as CAES (Eng. Compressed Air Energy Storage), where surplus electricity is stored in the form of compressed air in underground tanks. Gas compressed to a pressure of 70 atmospheres has a temperature of about 1000 K, i.e. over 700° C. When the energy demand becomes very high, the air from the reservoir is released and used to drive a turbine where electricity is generated, with the efficiency of this type of energy storage being between 40% and 70%. This type of storage of surplus energy in compressed air is an alternative to pumped hydroelectric energy storages, which are suitable for storing very large amounts of energy in a long time, taking power from the system during its oversupply, and delivering it in the period of increased demand, while the energy storage efficiency in these power plants ranges from 65 to 85%.

In addition, in the publication on the website http://zs9elektronik.pl/inne/karolina/podr_6_magazynowanie_i_transport_wodoru.pdf rozdział 6.3 i 6.4, it is stated that for storage, transport and dosing, hydrogen is compressed in high pressure tanks or stored in tanks in liquid form at a temperature below the critical temperature of hydrogen, i.e. below −240° C. Hydrogen can be transported via pipeline over short distances. However, an easier solution for transport, over longer distances, is rail or road transport with the use of special containers. In addition, many commercially available technologies are used to storing hydrogen. The most common method is to use high-pressure tanks that come in a variety of sizes and pressure ranges. Hydrogen can also be stored underground in caves, aquifers and spaces left over from oil and gas mining. Underground hydrogen storage systems are similar to natural gas storage systems, but are approximately three times more expensive.

Currently, there are attempts to store energy in a chemical form, consisting in the fact that electric current breaks down water into oxygen and hydrogen, which, as mentioned above, is an excellent fuel, having the best ratio of the amount of energy supplied during combustion to the weight of the fuel, therefore hydrogen is also used, as rocket fuel.

From the invention given in the patent description No. PL/EP3123094 regarding the energy storage, it can be seen, inter alia, that:

Due to the depleting resources of fossil energy carriers, the use of renewable energy sources has increased significantly in recent years. Increasing the use of these energy sources is also expected in the coming decades, because in addition to the increase in raw material prices, which will make the use of fossil energy carriers more unprofitable, the energy policy will also take into account the negative impacts on the global climate associated with the accumulation of carbon dioxide ($CO_2$) in the atmosphere.

Various renewable energy sources are known from the general state of the art, which include, for example, the use of solar radiation, wind power or biomass, whereby efforts being made to establish efficient energy storage facilities that can electrically or mechanically store energy from renewable energy sources and feed it into the electricity grid if necessary.

Furthermore, DE 10 2010 037 474 A1 discloses a tank device for an energy storage system comprising at least a storage tank and at least a first heat transfer medium, the storage tank has a housing containing a storage medium and at least a first heat exchanger arrangement, in contact with the said storage medium, whereby at least a first heat exchanger arrangement comprises a first heat transfer medium. At least a second arrangement of heat exchangers is located within the housing with a second heat transfer medium, whereby the second heat transfer medium is substantially gaseous.

On the other hand, the Polish patent description No. PL184289 describes a method of storing and transporting compressed gas, in particular to a gas distribution system, in which gas is obtained at a gas supply point located away from the distribution system, where the gas obtained is injected into a substantially continuous pipe bent to form a plurality of layers, each containing a plurality of pipe coils and/or loops, the substantially continuous pipe is then transported along with the gas in the ship bunker to the gas distribution system and the gas is discharged in the gas distribution system, whereby during gas discharge in the gas distribution system, the substantially continuous pipe is cooled and the cooled substantially continuous pipe is transported back to the gas supply point.

From the patent description of the invention No. WO2012/174642A1 a compressed gas energy storage and release system (CGESR) is known, consisting of a gas compression compressor connected via a first conduit to a compressed gas storage container, from which compressed gas is transported through a second conduit running in down below the surface of the ground into a high-temperature underground geothermal formation, where the gas is heated, and then the gas so heated is directed to an above-ground pressure engine driven by the expansion of said compressed gas, thereby converting the compressed gas into mechanical work, which in turn is converted by appropriate means into electricity.

SUMMARY OF THE INVENTION

The essence of this, however, is to transport gas/air through conduits to geothermal formations having a high temperature region to compensate for the temperature drop while expanding the gas/air, which translates into an extended life of the pressure engines. In this solution, gas/air is not stored in pipes but in a geological formation.

The aim of the invention is to develop a simple structure of an system for transporting and storing, in particular hydrogen and its mixtures, primarily energy produced by renewable energy sources and surplus energy networks, as well as other ecological energy sources such as nuclear power plants or other ecological sources of low-emission (green) hydrogen production. On the other hand, the possibility of vertical direct connection of terrestrial consumers to this installation will result in significant savings in the design and construction of hydrogen, or its mixtures, distribution stations, which will also have a positive impact on the popularization of hydrogen as fuel, with a simultaneous significant reduction in the costs of its production and distribution.

A further aim of the invention is to develop such a system for transporting and storing hydrogen, in particular hydrogen and its mixtures, which in the future will allow for the creation of local universal networks for the production, distribution and consumption of hydrogen as an alternative method of obtaining energy for various purposes. These networks will naturally be able to connect with each other into larger and larger areas, providing a cheap form of "hydrogenation" of the future society, without any barriers and limitations, which will be ensured by a horizontal drilling conducted in various directions, at various angles and at any depth, without the need to carrying out ground works and related difficulties and inconveniences.

BRIEF DESCRIPTION OF THE DRAWINGS

The subject of the invention in five exemplary embodiments is shown in FIGS. 1-6, in which.

DETAILED DESCRIPTION OF THE INVENTION

Figures 1, 2:
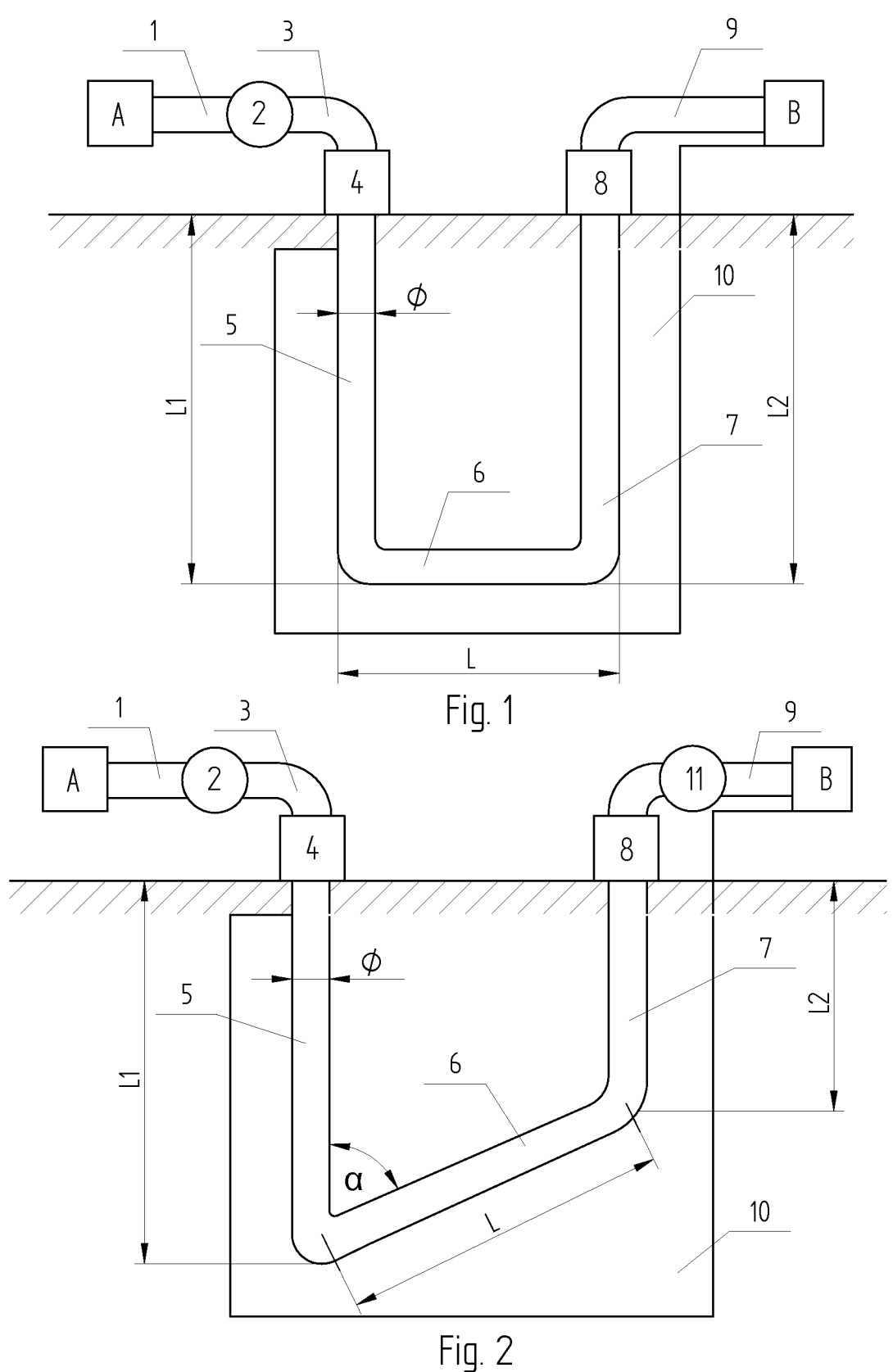
FIG. 1 shows a front view of the first embodiment of the system for transporting and storing hydrogen, in an assembled state of its functionally connected components.
FIG. 2 shows a front view of the second embodiment of the system for transporting and storing hydrogen, in an assembled state of its functionally connected components.

The installation for transporting and storing hydrogen and its mixtures from their supplier to the consumer, partially located underground, is characterized by the fact that it consists of at least two vertically arranged tubular elements connected with each other by another tubular element, forming together a U-shaped tubular profile, whereby the upper end of the vertical tubular elements is connected via a non-return valve to a tubular element into which hydrogen and/or its mixtures are pumped from another tubular element connected to at least one hydrogen and its mixtures, and the upper end of the second vertical tubular element by the non-return valve is connected to a further tubular element connected to at least one consumer of hydrogen and/or its mixtures. A heating and cooling device adheres to the outer surfaces of the tubular elements forming the U-profile and to the last tubular element, the tubular U-profile is placed below the ground surface, below the permafrost border, and the weight of the upper ground layer above the tubular U-profile" balances at least the planned gas pressure in this profile.

Preferably, the tubular element connecting the vertical tubular elements is positioned horizontally below the ground.

Also preferably, the tubular element connecting the vertical tubular elements is located aslope below the ground surface such that an acute angle is formed between one of the vertical tubular elements and the tubular element.

Also preferably, all vertically arranged tubular elements are arranged parallel to each other.

Also preferably, the last tubular element is provided with a pump mounted between the non-return valve and the consumer.

Also preferably, a device for equalizing the pressure of hydrogen and/or its mixtures is arranged between the first pump and the non-return valve.

Also preferably, the device for equalizing the pressure of hydrogen and/or its mixtures consists of two low pressure equalizing tanks, connected by a tubular element equipped with non-return valves to the pump and by further tubular elements with further non-return valves to a medium pressure equalizing tank located below the ground surface, which in turn is connected via a non-return valve to the vertical tubular element of the tubular U-profile.

Also preferably, the diameter of the vertical tubular elements and the connecting tubular element is 5-100 cm.

Also preferably, the first pump pumps the hydrogen and/or its mixtures into the U-profile at a pressure of at least 100 bar.

In addition, the system for transporting and storing hydrogen and its mixtures from their supplier to the consumer, partially located underground, is characterized by the fact that it consists of a tubular U-shaped element located below the ground, bent in its lower part, whereby one upper end of the tubular element, via the non-return valve, is connected to the tubular element into which the pump pumps hydrogen and/or its mixtures from the first tubular element connected to the supplier of hydrogen and/or its mixtures, and the other upper end of the tubular U-shaped element is connected, via another non-return valve, to the tubular element connected to the consumer of hydrogen and/or its mixtures, and the heating and cooling device adheres to the outer surfaces of the tubular U-element and the last tubular element.

Also preferably, the first pump pumps the hydrogen and/or its mixtures into the tubular U-shaped element at a pressure of at least 100 bar.

Also preferably, the last tubular element is provided with an additional pump, mounted between the further non-return valve and the consumer.

Also preferably, the tubular U-shaped element has a diameter of at least 20 mm.

The use of transport and storage systems, in particular hydrogen and its mixtures, obtained by electrolysis from cheap, local renewable energy sources or unused energy surpluses of the national system, as well as blue hydrogen produced from fossil fuels in combination with $CO_2$ capture or other green hydrogen production methods, according to the invention, will allow:

a safe, automatic, immediate and non-contact transporting hydrogen/gases from the producer to the consumer as well as safe and ecological storing also in the long term without losses, significant amounts of gases/hydrogen in a state of high concentration simultaneous supplying gas/hydrogen to the installation from various sources (suppliers) located in different places and its supplying to independent consumer (which will eliminate the dominance of energy and fuel monopolies—free energy)

significant reducing in the price of hydrogen/gas at the end consumer, also caused by the elimination of expensive road transport using and revitalizing the existing, no longer active mining wells, which will also contribute to reducing the level of methane escaping into the atmosphere—a dangerous greenhouse gas significant reducing in costs of construction and operation of gas/hydrogen distribution stations, their physical size and location, as well as accompanying infrastructure, due to the lack of the need to build expensive tanks next to distributors and large safety zones in critical places of communication routes, which will also positively affect the speed and universality of use hydrogen as an energy source.

The solution according to the invention will enable the transition to the so-called "Distributed Energy", which will be one of the possible further forms of reducing energy costs and saving it, due to the lack of the need to build expensive and energy-consuming extended transmission lines. The possibility of producing and storing hydrogen, assumed in the solution according to the invention, primarily for their own needs, by individual users, will allow individual recipients (consumers) to become completely independent from the Central National Energy Network, which will also significantly reduce energy costs, and operate in accordance with the assumptions of the so-called the concept of "Society 5.0".

Example 1

The system for transporting and storing hydrogen according to the first embodiment shown in FIG. 1 consists of a horizontally situated tubular element 1, located above the ground, one end of which is connected to the hydrogen supplier A, which is an above-ground storage reservoir (cistern type), and the other end of this tubular element 1 is connected to a pump 2 forcing hydrogen at pressure of 700 bar into a arched tubular element 3 connected to a controllable non-return valve 4 (open-close type) connected to a first underground vertical tubular element 5 of height H1=10 m, which is connected via a horizontal tubular element 6 with a length L=100 m to a second vertical tubular element 7 with a height H2=10 m, so that both vertical tubular elements 5 and 7 and the horizontal pipe element 6 form a tubular U-shaped profile. The upper end of the vertical tubular element 7 is connected to a controlled non-return valve 8 (open-close type) protruding above the ground surface, which is connected to an arched tubular element 9, which supplies hydrogen to customer B—a retail hydrogen distribution station, e.g. for fuelling vehicles with hydrogen engines. In addition, a heating and cooling device 10, supplied from the 230V mains, adheres to the outer surface of the tubular elements 5, 6, 7 and 9, which maintains the hydrogen temperature in the entire network at 20° C. Moreover, in this embodiment, each of the tubular elements 5, 6 and 7 has a diameter of $\phi$=5 cm.

Example 2

The system for transporting and storing hydrogen together with natural gas according to the second embodiment shown in FIG. 2 has a structure similar to the system described in the first example (FIG. 1), and the difference between them is that in the second embodiment of the system the lower ends of the vertically and collaterally spaced tubular elements 5 and 7 are connected by an aslope arranged tubular element 6 such that an acute angle $\alpha$=70° is formed between the tubular element 5 and aslope arranged the tubular element 6, whereby the height of the vertical tubular element 5 is H1=300 m, the height of the vertical tubular element 7 is H2=100 m and the length of aslope arranged the tubular member 6 is L=3000 m. In addition, in this second embodiment of the network, hydrogen and natural gas is forced via pump 2 into the arched tubular element 3 at a pressure of 1000 bar, and the tubular element 9 is equipped with an additional pump 11 for pumping hydrogen with natural gas, mounted between the controllable non-return valve 8, whereby the city/local gas system is customer B of this hydrogen. In turn, the tubular elements 1, 3, 5, 6, 7 and 9 are made of austenitic steel, whereby both vertical tubular elements 5 and 7 have the diameter of ϕ=18 cm, while the tubular element 6 connecting them aslope has the diameter of ϕ=15 cm.

Example 3

Figure 3:
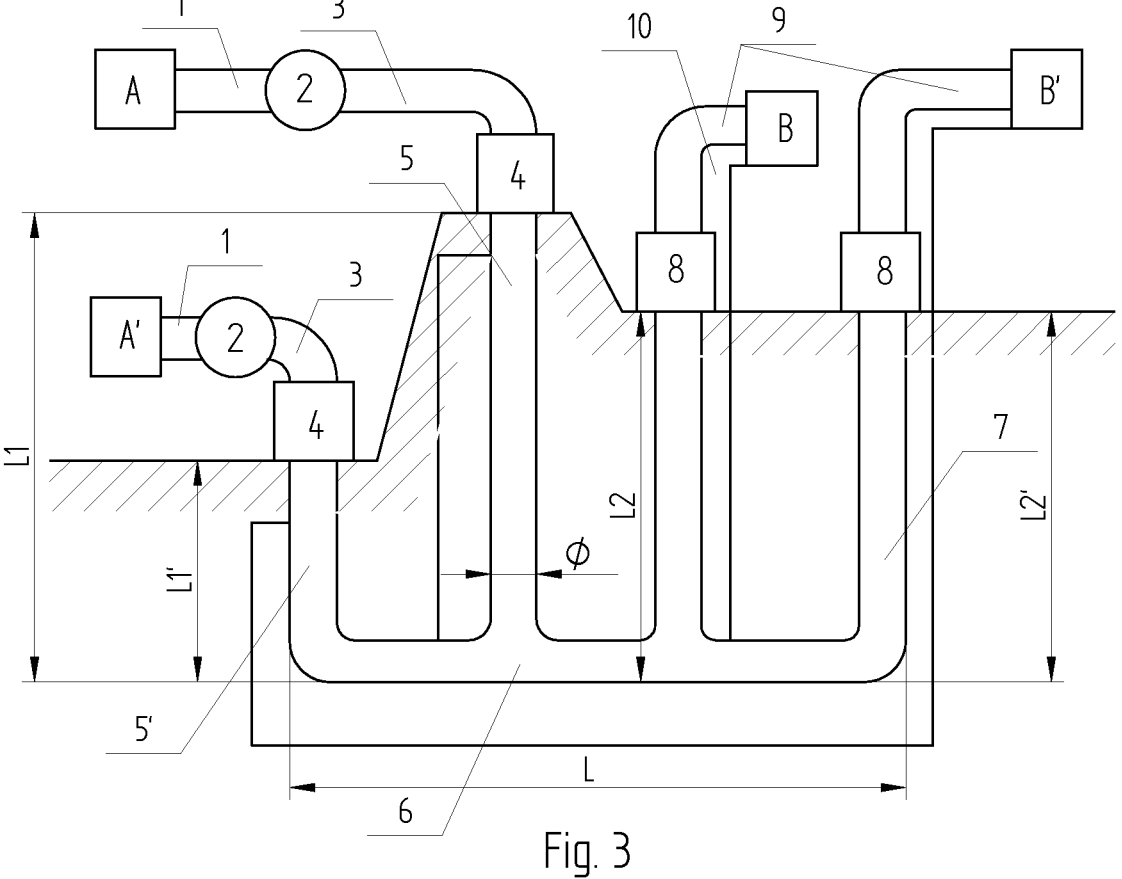
FIG. 3 shows a front view of the third embodiment of the system for transporting and storing compressed hydrogen, in an assembled state of its functionally connected components.

The system for transporting and storing compressed hydrogen according to the third embodiment shown in FIG. 3 has a structure similar to the system described in the first example, and the difference between these embodiments is that in this third embodiment, compressed hydrogen supplied from two independent suppliers A and A' through tubular elements 1, pumps 2, arched tubular elements 3, controllable non-return valves 4 and vertical tubular elements 5 and 5' is forced into a common horizontal tubular element 6 connected to these vertical tubular elements 5 and 5' and also connected to two vertical tubular elements 7 and 7' from where, through valves 8 and arched tubular elements 9, it is supplied to two independent consumers B and B'. In this embodiment, consumer B is a Hampson-Linde condenser (not shown), positioned in a U-shaped element below the ground, acting as Dewar vessels, and connected to a compressed hydrogen network. As a result, liquefied hydrogen is obtained, used, for example, in reciprocating engines, as a fuel for fuelling aircraft just before their departure, as a fuel for fuelling all types of launch vehicles and in other technological processes requiring liquefied hydrogen.

Moreover, in this embodiment, the height of the vertical tubular element 5 is H1=500 m, the height of the vertical tubular element 5' is H1'=300 m, the height of the tubular element 7 and 7' is H2=500 m, and the length of the tubular element 6 is L=10000 m while the diameter of the tubular elements 5, 5', 6, 7 and 7' is ϕ=30 cm. In the embodiment of this network, a heating and cooling device 10 is adjacent to the outer surfaces of the tubular elements 5, 5', 6, 7, 7' and 9, and hydrogen at a temperature of 20° C. is forced by pumps 2 at a pressure of 800 bar.

Example 4

Figure 4:
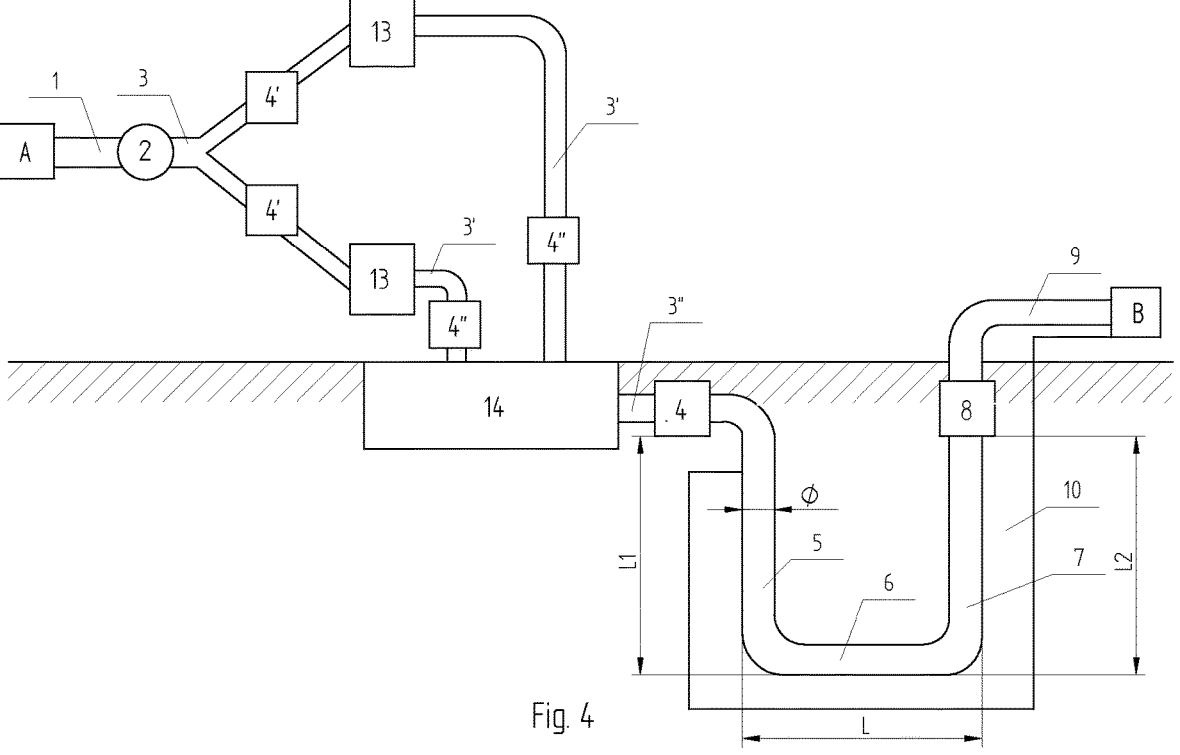
FIG. 4 shows a front view of the fourth embodiment of the system for transporting and storing compressed hydrogen, additionally equipped with a device equalizing the hydrogen pressure.

The system for transporting and storing compressed hydrogen according to the fourth embodiment shown in FIG. 4 has a structure similar to that described in the first example, and the difference between these embodiments is that in this embodiment a device 12 for equalizing the pressure of hydrogen in the system is located between the pump 2 and the controllable non-return valve 4. This device consists of the tubular element 3, one end of which is connected to the pump 2, and the other branched end is connected by controllable non-return valves 4' to two low pressure equalizing tanks 13 of not less than 100 bar located below each other, whereby equalizing tanks 13 through tubular elements 3' with non-return valves 4" are connected to a equalizing tank 14 of the medium pressure of not less than 500 bar located below the ground surface, which in turn is connected via a tubular element 3" and a controlled non-return valve 4 to a vertical tubular element 5 of the U-shaped element of the system.

Mounting the additional device 12 for equalizing the pressure in this embodiment of the system according to the invention resulted in the maintenance of a constant gas pressure level in the pipeline at 700 bar in the case of mixing this pressure in the installation as a result of hydrogen consumption by the consumer or consumers B, B'.

In another embodiment, not shown, an system according to the invention similar to that described in example 1 is used for transporting and storing ammonia.

In all variants of the implementation of the system for transporting and storing hydrogen and its mixtures, the tubular elements 5, 5', 6, 7 and 7' are embedded in vertical and horizontal (corridor) boreholes previously drilled in the ground, and the system according to the invention can also be placed in existing mining wells, which makes it possible to revitalize them. Moreover, the tubular elements 5, 5', 6, 7 and 7' of the system according to the invention are made of materials intended for contact with specific gases, inter alia resistant to hydrogen fragility. They are multilayer composite pipes made of various materials, preventing the diffusion of even single hydrogen atoms. On the other hand, the temperature in the system is maintained by commonly used heating and cooling units or units of heat exchangers.

The heating and cooling devices used in the solution according to the invention are typical devices used for heating and/or cooling gas, such as e.g. the GHP Chiller pump or other device using the water/glycol cycle, which stabilize the gas temperature depending on its type and pressure, whereby the device is selected individually according to the type of system and the compressor/pump used.

In other, not shown embodiments, the vertical tubular elements and the horizontal tubular elements are positioned in different configurations (at different angles) respecting the communicating vessels (U-tubes) principle.

It is obvious that the horizontal section of the system according to the invention may have several independent connections with suppliers and consumers, and the diameters, heights and lengths of its individual tubular elements are not limited to those presented in the embodiments and may depend on the distance between the supplier and the consumer, technical possibilities, subsoil layers, etc., the minimum depth of insertion of the tubular U-profile must be greater than the permafrost limit, and the weight of the upper earth layer above the U-profile must balance at least the planned gas pressure in its tubular elements, whereby in the system according to the invention, transported and stored gas is compressed to a pressure in the range of 100-1000 bar.

Figure 5:
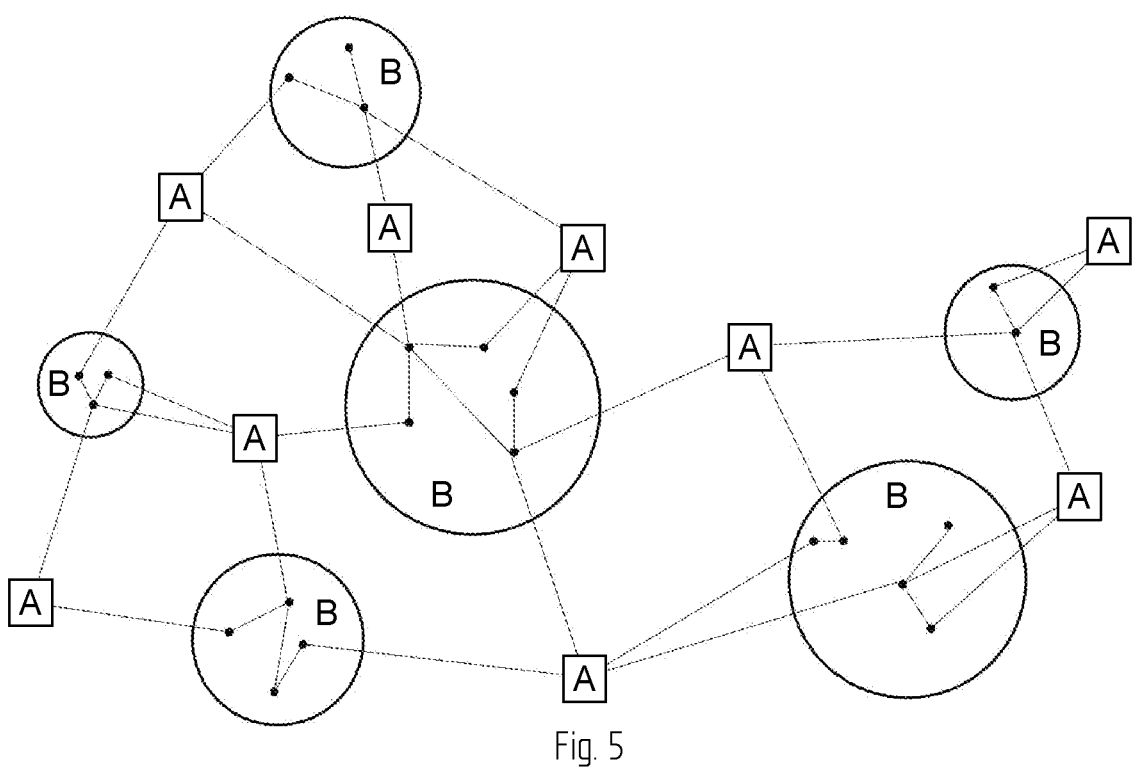
FIG. 5 shows an example of several interconnected systems forming a network for transporting and storing hydrogen.

In addition, connecting several systems according to the invention with each other makes it possible to create a hydrogen network supplying hydrogen and its mixtures from one supplier to several, even very distant consumers, including to another city or region, as well as supplying this gas from several suppliers to one consumer, as schematically shown in FIG. 5.

Figure 6:
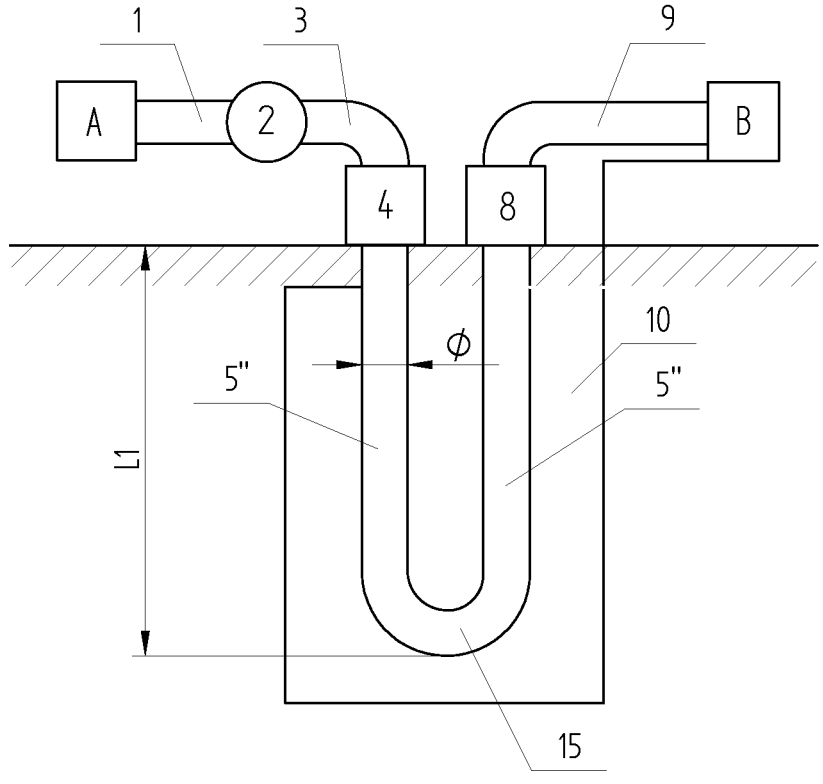
FIG. 6 shows a front view of the fifth embodiment of the system for transporting and storing hydrogen, in an assembled state of its functionally connected components.

In the further embodiment shown in FIG. 6, the system according to the invention has a structure similar to that of the system shown in the first embodiment (FIG. 1), the difference between them is that in this example the tubular U-profile was replaced by a U-shaped tubular element 5" arched in its lower part 15, one upper end of which is connected to the tubular element 3 through a non-return valve 4, while the other upper end of the tubular element 5" is connected to the tubular element 9 via a non-return valve

8 and a heating and cooling device 10 is adjacent to the outer surfaces of the tubular elements 5″ and 9, whereby the tubular U-shaped element 5″ has a diameter of Ø=100 cm and a length of L1=300 cm and is placed in a 3.5 m deep and 300 cm diameter hole in the ground, which after placing the tubular element 5″ and the heater 10 in it is buried with earth.

In this embodiment, the surplus energy produced by supplier A, for example a home photovoltaic farm, is electrolysed in an electrolyzer (not shown in the drawing) installed upstream of the pump 2, which produced hydrogen, which is then forced by the pump 2 at a pressure of 800 bar into the arched tubular element 3 connected to the controllable non-return valve 4, and then to the tubular U-profile 5″ in which the hydrogen is stored. In order to use the hydrogen stored in this way, through the non-return valve 8 and the tubular element 9, hydrogen is supplied to customer B, who was a household, where a galvanic cell installed at it converted this hydrogen into electricity used for his own needs.

On the other hand, in other embodiments of the implementation of this system, the tubular U-profile element has a diameter of Ø=20 mm or 150 mm or 450 mm and a length of L1=5 m or 150 m or 500 m and is placed in a hole drilled in the ground at a depth of 5.5 m, or 350.5 m or 500.5 m with a diameter of 50 mm, or 250 mm or 1000 mm, moreover, this system is additionally equipped with the pump (11), installed between the non-return valve (8) and the consumer (B), while the pump 2 pumps hydrogen at a pressure of 100 bar or 1000 bar or 3000 bar.

It is obvious that the diameters and lengths of the tubular elements, as well as the depth and diameter of the hole in the ground are not limited to those shown in this embodiment, and furthermore, this system is used for storing and transporting hydrogen mixtures such as hydrogen with natural gas used, in particular, in factories.

The system for transporting and storing compressed hydrogen according to the invention presented in its embodiments ensures safe transport of hydrogen and its storage without air access, moreover, the system according to the invention is not limited only to transport and storage of hydrogen and its mixtures presented in the examples, but the method of its implementation that is, sealing the individual components together is known and commonly used for this type of systems and is obvious to a person skilled in the art.

The invention claimed is:

1. A system for transporting and storing hydrogen and its mixtures from a supplier to a customer, the system is partially located underground and comprises:

at least two vertically positioned tubular elements (5, 5′, 7, 7′) connected with each other by a third tubular element (6) forming a tubular U-profile;

wherein an upper end of the at least two vertical positioned tubular element (5, 5′) is connected via a non-return valve (4), to a fourth tubular element (3) into which a pump (2) pumps hydrogen and/or its mixtures from a fifth tubular element (1) connected to at least hydrogen and/or its mixtures supplier station (A, A′), wherein an upper end of the at least two vertical tubular element (7, 7′) is connected via a non-return valve (8) to a sixth tubular element (9) connected to at least one hydrogen and/or its mixtures consumer station (B, B′), and a heating and cooling device (10) adheres to outer surfaces of the tubular elements (5, 5′, 6, 7, 7′, 9);

wherein the tubular U-profile is placed below the ground surface, below a permafrost border, and a weight of an upper layer of the earth above the tubular U-profile balances at least a planned gas pressure in the tubular elements (5, 5′, 6, 7, 7′), wherein the system further includes a device (12) for equalizing the pressure of hydrogen and/or its mixtures is arranged between the pump (2) and the non-return valve (4).

2. The system according to claim 1, further including two low pressure equalizing tanks (13), connected by the fourth tubular element (3) equipped with non-return valves (4′) to the pump (2) and by seventh tubular elements (3′) with non-return valves (4″) to an medium pressure equalizing tank (14) located below the ground surface, which in turn is connected via the non-return valve (4) to the tubular element (5) of the tubular U-profile.

3. The system according to claim 1, wherein a diameter of the tubular elements (5, 5″, 6, 7, 7″) ranges from 5-100 cm.

4. The system according to claim 1, wherein the pump pumps hydrogen and/or its mixtures into the tubular U-profile at a pressure of at least 100 bar.

* * * * *